US010890217B2

(12) United States Patent
Yamaguchi et al.

(10) Patent No.: US 10,890,217 B2
(45) Date of Patent: Jan. 12, 2021

(54) HYDRAULIC CLUTCH DEVICE

(71) Applicant: HONDA MOTOR CO., LTD., Tokyo (JP)

(72) Inventors: Nobutaka Yamaguchi, Wako (JP); Kenji Niwata, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 208 days.

(21) Appl. No.: 15/915,479

(22) Filed: Mar. 8, 2018

(65) Prior Publication Data

US 2018/0259006 A1    Sep. 13, 2018

(30) Foreign Application Priority Data

Mar. 10, 2017 (JP) .................................. 2017-046828

(51) Int. Cl.
*F16D 48/02* (2006.01)
*F16D 13/52* (2006.01)
(Continued)

(52) U.S. Cl.
CPC .............. *F16D 25/14* (2013.01); *F16D 13/52* (2013.01); *F16D 25/0638* (2013.01);
(Continued)

(58) Field of Classification Search
CPC ...... F16D 25/14; F16D 25/0638; F16D 25/42; F16D 25/123; F16D 2300/26; F16D 2300/18; F16K 31/0613
See application file for complete search history.

(56) References Cited

U.S. PATENT DOCUMENTS 6,578,654 B2 * 6/2003 Porter ................ B60K 23/0808
                                                            180/249
6,942,055 B2 * 9/2005 Forsyth .................. B60K 17/34
                                                            180/249
(Continued)

FOREIGN PATENT DOCUMENTS

CN      103890434 A      6/2014
CN      105864309 A      8/2016
(Continued)

OTHER PUBLICATIONS

Office Action dated Aug. 28, 2018, issued in counterpart Japanese Application No. 2017-046828, with English machine translation. (10 pages).
(Continued)

*Primary Examiner* — Tinh Dang
(74) *Attorney, Agent, or Firm* — Westerman, Hattori, Daniels & Adrian, LLP (57) ABSTRACT

A hydraulic clutch device comprises an oil pump (7), a pressure regulating valve (8) for pressure-regulating oil discharged from the oil pump, and a hydraulic clutch (5) arranged in a power transmission route through which motive power is transmitted along a rotation shaft (4) from the power transmission part (2, 3), and engaged by the oil pressure-regulated by the pressure regulating valve. The pressure regulating valve is located on a downstream side in an oil flowing direction of the hydraulic clutch and arranged in the vicinity of an opposite side to the power transmission part in the axial direction of the rotation shaft with respect to the hydraulic clutch. With this configuration, it is possible to dispense with a pressure regulating valve arranged between a power transmission part and a hydraulic clutch and a valve body integrally provided with the pressure regulating valve in a conventional hydraulic clutch device.

12 Claims, 8 Drawing Sheets

(51) Int. Cl.
　　　*F16D 25/08*　　　(2006.01)
　　　*F16D 25/0638*　　(2006.01)
　　　*F16D 25/12*　　　(2006.01)
　　　*F16D 25/062*　　 (2006.01)
　　　*F16K 31/06*　　　(2006.01)

(52) U.S. Cl.
　　　CPC .......... *F16D 25/083* (2013.01); *F16D 25/123* (2013.01); *F16D 2300/18* (2013.01); *F16D 2300/26* (2013.01); *F16K 31/0613* (2013.01)

(56) References Cited

U.S. PATENT DOCUMENTS

| | | | | |
|---|---|---|---|---|
| 6,953,411 | B2* | 10/2005 | Burns | B01D 29/055 192/103 F |
| 7,294,086 | B2* | 11/2007 | Brissenden | F16D 25/14 475/231 |
| 7,588,133 | B2* | 9/2009 | Ronk | F16D 29/00 192/84.2 |
| 9,056,545 | B2* | 6/2015 | Norita | F16H 61/0009 |
| 9,217,506 | B2* | 12/2015 | Reisch | H02K 11/0094 |
| 9,316,270 | B2* | 4/2016 | Mitsubori | F16D 25/06 |
| 2002/0144851 | A1 | 10/2002 | Porter | |
| 2014/0172250 | A1* | 6/2014 | Tamai | F16H 57/0447 701/51 |

FOREIGN PATENT DOCUMENTS

| | | |
|---|---|---|
| JP | 4-307148 A | 10/1992 |
| JP | 6-63939 A | 3/1994 |
| JP | 2011-149535 A | 8/2011 |
| JP | 5372792 B2 | 12/2013 |
| JP | 5844506 B1 | 1/2016 |

OTHER PUBLICATIONS

Office Action dated Apr. 25, 2019, issued in counterpart CN application No. 201810193855.9, with English translation. (9 pages).
Chinese Search Report dated Apr. 17, 2019, issued in counterpart application No. 201810193855.9. (2 pages).

* cited by examiner

Fig.1

X-X SECTION

HYDRAULIC CLUTCH DEVICE

CROSS-REFERENCE OF RELATED APPLICATION

This application claims priority of Japanese Patent Application No. 2017-046828 filed in Japan on Mar. 10, 2017, the entire contents of which are incorporated herein by reference.

TECHNICAL FIELD

The present invention relates to a hydraulic clutch device provided with a pressure regulating valve for pressure-regulating oil which is discharged from an oil pump and a hydraulic clutch to be engaged by the oil pressure-regulated by the pressure regulating valve.

BACKGROUND ART

A hydraulic clutch for switching the presence and absence of the power transmission and adjusting a power transmission amount is provided in a power transmission route of a vehicle or the like. Then, as an oil pressure control device for feeding the oil (hydraulic oil) to the hydraulic clutch, there is known the oil pressure control device provided with an oil strainer which collects the oil, an oil pump which pumps up the oil from the oil strainer and feeds it to the hydraulic clutch, a piston chamber (oil chamber) which operates a piston for engaging the hydraulic clutch, and a pressure regulating valve (linear solenoid valve) which pressure-regulates the oil to a predetermined pressure (oil pressure) (for example, see Japanese Patent No. 5844506).

In the oil pressure control device described in Japanese Patent No. 5844506, the oil pumped up by the oil pump from the oil strainer passes through an oil passage on a supply side and is fed to the piston chamber of a hydraulic piston. Thereafter, it is fed to the pressure regulating valve through an oil passage on a return side. Then, after being pressure-regulated to the predetermined pressure in this pressure regulating valve, it is fed for lubrication of rotational sliding parts such as a bearing, a clutch and the like.

By the way, in the hydraulic clutch device described in Japanese Patent No. 5844506, a vale body on which the pressure regulating valve is integrally mounted is housed in a casing (center casing) of the power transmission device (power transmission part) composed of a drive bevel gear and a driven bevel gear which are meshed with each other. Moreover, the pressure regulating valve and the valve body are arranged in a position located between the power transmission device and the hydraulic clutch in the axial direction of a wheel axle (rotation shaft) of a driving wheel. Therefore, a space in the axial direction is required between the power transmission device and the hydraulic clutch in order to provide an arrangement space for the pressure regulating valve and the valve body. Accordingly, in order to accomplish further reduction in external dimension (especially, dimension in the axial direction of the wheel axle) and simplification in configuration with respect to the hydraulic clutch device and the power transmission device provided with the hydraulic clutch device, it is required to optimize the arrangement configuration of the device.

There are needs for improving the background art and providing a hydraulic clutch device which is capable of accomplishing the reduction in external dimension and the simplification in configuration with respect to a hydraulic clutch device and a power transmission device provided therewith.

SUMMARY OF INVENTION

In order to achieve the above referred object, a hydraulic clutch device in one embodiment according to the present invention comprises an oil pump (7), a pressure regulating/control valve (8) for pressure-regulating oil discharged from the oil pump, and a hydraulic clutch (5) being arranged in a power transmission route through which motive power is transmitted along a rotation shaft (4) from the power transmission part (2, 3), and engaged by the oil pressure-regulated by the pressure regulating valve, wherein the pressure regulating valve is located on a downstream side in an oil flowing direction of the hydraulic clutch and arranged in the vicinity of an opposite side to the power transmission part in the axial direction of the rotation shaft with respect to the hydraulic clutch (i.e., the power transmission part, the hydraulic clutch, and the pressure regulating valve are disposed and aligned in this order along the axial direction of the rotation shaft from the middle toward the axial end thereof).

According to the hydraulic clutch device of another embodiment of the present invention, since the pressure regulating valve is arranged in the vicinity of the opposite side to the power transmission part in the axial direction of the rotation shaft with respect to the hydraulic clutch, it is possible to dispense with a pressure regulating valve arranged between a power transmission part and a hydraulic clutch and a valve body integrally provided with the pressure regulating valve in a conventional hydraulic clutch device. Therefore, the power transmission part and the hydraulic clutch can be arranged close to each other, so that it is possible to accomplish the reduction in external dimension (especially, dimension in the axial direction of the rotation shaft), the simplification in configuration, the weight saving and the like, with respect to the hydraulic clutch device and the power transmission device.

Further, the pressure regulating valve may be mounted in a casing (58) in which the hydraulic clutch is housed, and there may be provided a protection member (95) which covers at least a part of the pressure regulating valve exposed from the casing.

According to this configuration, the pressure regulating valve exposed from the casing can be protected by the provision of the protection member. In addition, since the pressure regulating valve is exposed from the casing, the maintainability of the pressure regulating valve can be improved, and since at least a part of the pressure regulating valve is covered by the protection member, the protection of the pressure regulating valve can be provided. Therefore, the improvement in maintainability and the protection of the pressure regulating valve can be made compatible.

Moreover, the hydraulic clutch device further comprises an oil pressure sensor (90) for detecting an oil pressure of the oil fed to the hydraulic clutch, wherein the oil pressure sensor may be arranged in the vicinity of the opposite side to the power transmission part in the axial direction of the rotation shaft with respect to the hydraulic clutch.

According to this configuration, since both of the pressure regulating valve and the hydraulic clutch are arranged in the vicinity of the opposite side to the power transmission part in the axial direction of the rotation shaft, not only the pressure regulating valve but also the oil pressure sensor is not required to be arranged between the power transmission part and the hydraulic clutch. Therefore, since the power transmission part and the hydraulic clutch are able to be arranged closer to each other, the external dimensions (especially, dimensions in the axial direction of the rotation shaft) of the hydraulic clutch device and the power transmission device can be further reduced.

Further, the pressure regulating valve may be arranged above the middle in the height direction of the hydraulic clutch, and the oil pressure sensor may be arranged below the middle in the height direction of the hydraulic clutch.

According to this configuration, since the pressure regulating valve and the oil pressure sensor are able to be arranged in such a way as not to overlap with each other in the axial direction of the rotation shaft, in such a configuration that both of the pressure regulating valve and the oil pressure sensor are arranged on the same side with respect to the hydraulic clutch, outwardly projecting dimensions of the pressure regulating valve and the oil pressure sensor from the hydraulic clutch can be reduced. Therefore, the external dimensions of the hydraulic clutch device may be minimized.

Further, the oil pressure sensor may be mounted on the casing, and the protection member may cover at least a part of the oil pressure sensor exposed from the casing.

According to this configuration, both of the pressure regulating valve and the oil pressure sensor can be covered so as to be protected by the single protection member. Therefore, components parts of the hydraulic clutch device and the power transmission device can be decreased, so that the configuration can be simplified.

Further, the pressure regulating valve has a main body part (85) and a connector (89) which is integrally provided on a lateral (side) surface of the main body part so as to connect a wiring member to the main body part, wherein the connector may be arranged in an obliquely upward position inclined to a closer side to the hydraulic clutch with respect to a position right above the main body part.

With this configuration, since the connector of the pressure regulating valve may be arranged in the obliquely upward position inclined to the closer side to the hydraulic clutch with respect to a position right above the main body part, the connector is arranged so as to be interposed between the main body part of the pressure regulating valve and the hydraulic clutch, so that an arrangement space of the connector can be optimized. Therefore, the external dimensions of the hydraulic clutch device may be further reduced. Moreover, since the connector is arranged in the obliquely upward position of the main body part, the connecting operation of the wiring member to the connector can be easily performed. Thus, the workability for mounting work and replacement work of the pressure regulating valve can be improved.

Further, the oil pressure sensor is provided with a connector (91) for connecting a wiring member, wherein the connector of the pressure regulating valve and the connector of the oil pressure sensor are configured such that each of the wiring members connected to these connectors extends in substantially the same direction in a condition where the pressure regulating valve and the oil pressure sensor are mounted in the casing.

With this configuration, since the wiring member connected to the connector of the pressure regulating valve and the wiring member connected to the connector of the oil pressure sensor extend in substantially the same direction, these wiring members can be bound together and gathered in one place. Therefore, the arrangement space for the wiring members can be suppressed to be small. Thus, the compactification and the simplification in configuration of the hydraulic clutch device can be accomplished. In addition, mounting operation of the pressure regulating valve and the oil pressure sensor can be easily performed in the assembling work of the hydraulic clutch device.

Further, the hydraulic clutch may be formed of a pair of hydraulic clutches (5L, 5R) which is arranged on each of outsides in the axial direction of the rotation shaft with respect to the power transmission part, and the pressure regulating valve may be formed of a pair of pressure regulating valves (8L, 8R) which is arranged on the outside of each of the pair of hydraulic clutches.

Incidentally, the above reference numerals in parentheses designate, for reference, corresponding reference numerals in the drawings of component elements in an embodiment to be referred to later.

Effect of Embodiments of the Invention

The hydraulic clutch device according to embodiments of the present invention can accomplish the reduction in external dimension and the simplification in configuration with respect to the hydraulic clutch device and the power transmission device provided therewith.

BRIEF DESCRIPTION OF THE DRAWINGS

FIGS. 3(*a*) and 3(*b*) are views showing an external appearance configuration of the power transmission device, wherein FIG. 3(*a*) is a plan view and FIG. 3(*b*) is a side view;

FIGS. 5(*a*) and 5(*b*) are cross sectional views of an essential part of a pressure regulating valve, wherein FIG. 5(*a*) is a cross sectional view taken along line C-C of FIG. 2, and FIG. 5(*b*) is a cross sectional view taken along line D-D of FIG. 5(*a*);

DETAILED DESCRIPTION OF EMBODIMENTS OF THE INVENTION

Figure 1:
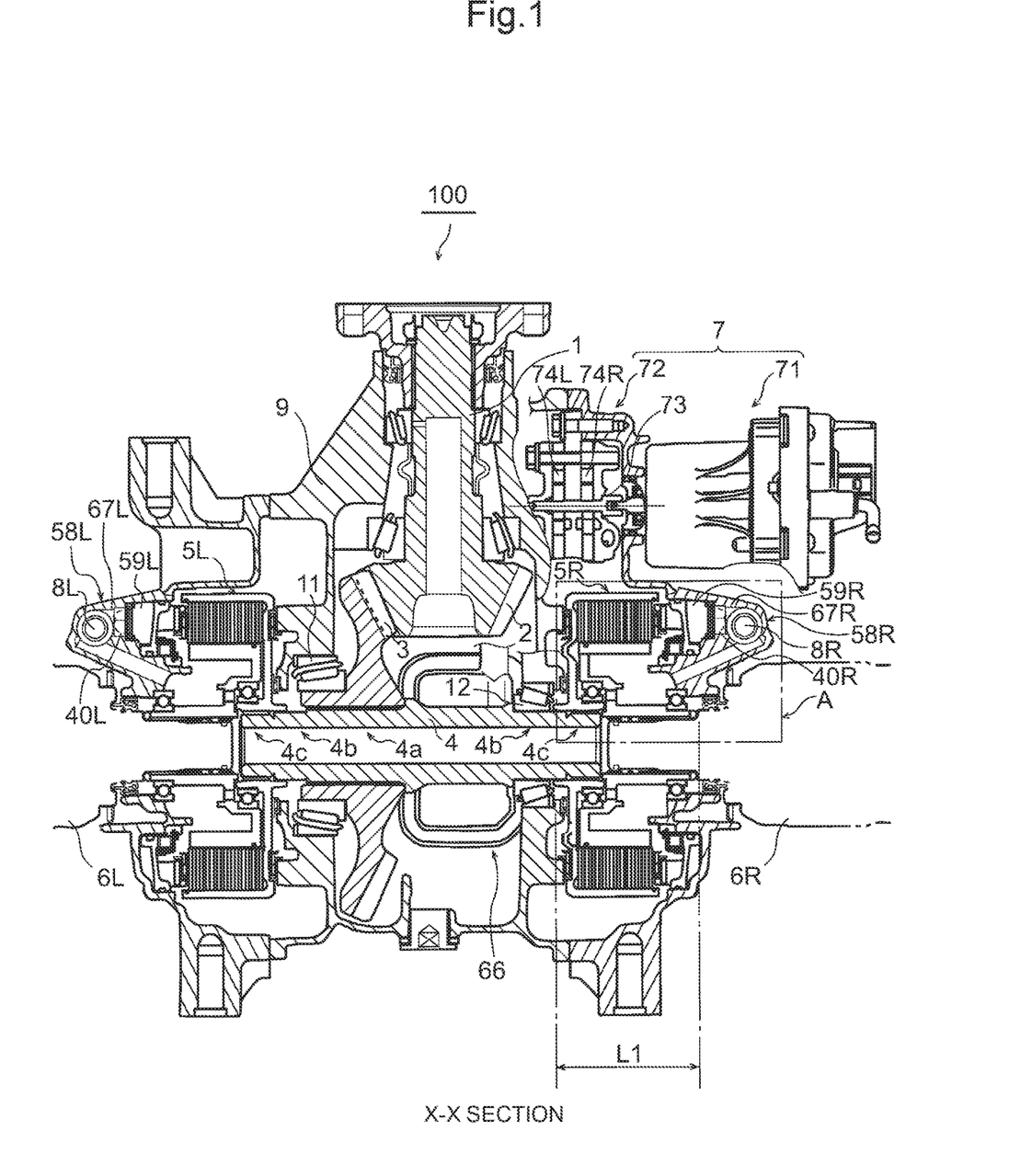
FIG. 1 is a cross sectional view showing the whole configuration of a power transmission device provided with a hydraulic clutch device in accordance with an embodiment of the present invention.
Figure 2:
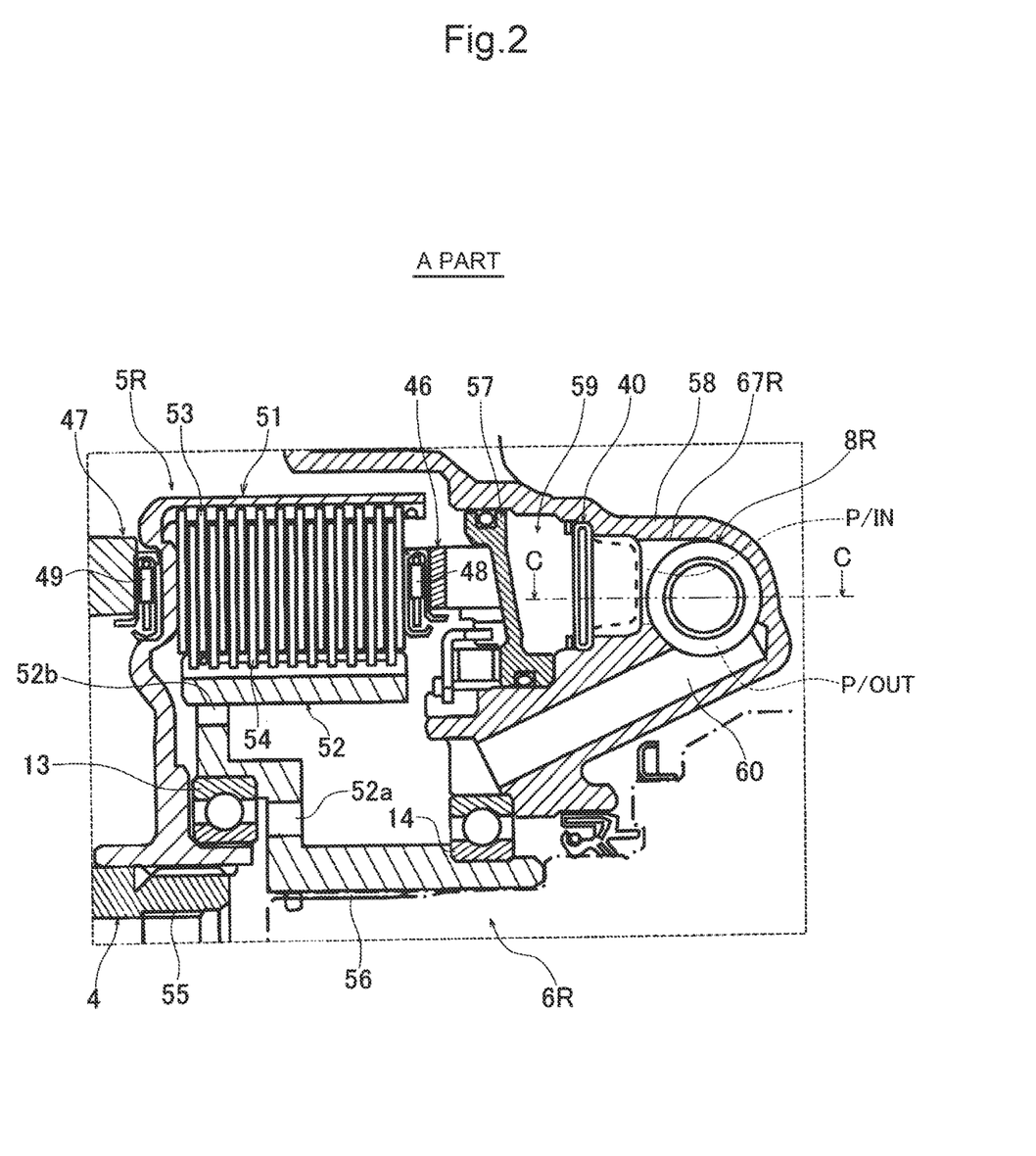
FIG. 2 is an enlarged view of a part A of FIG. 1.
Figure 3A:
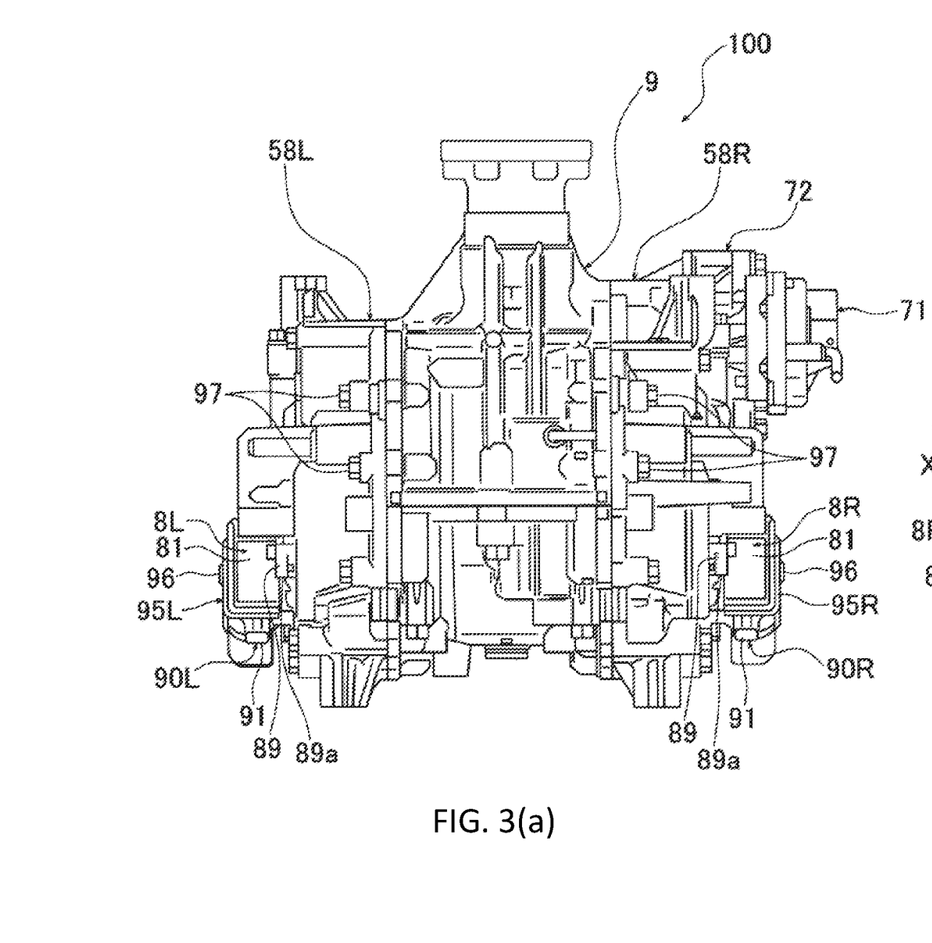
Figure 3B:
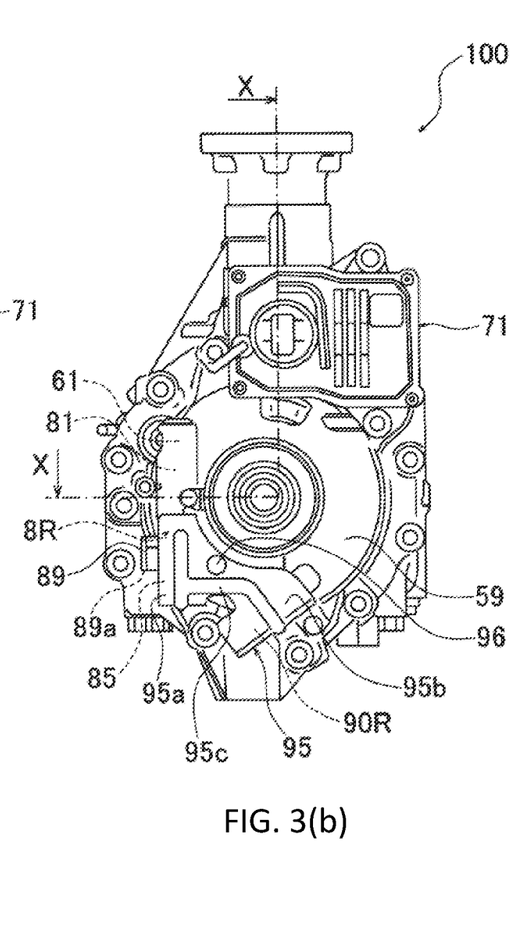
Figure 4:
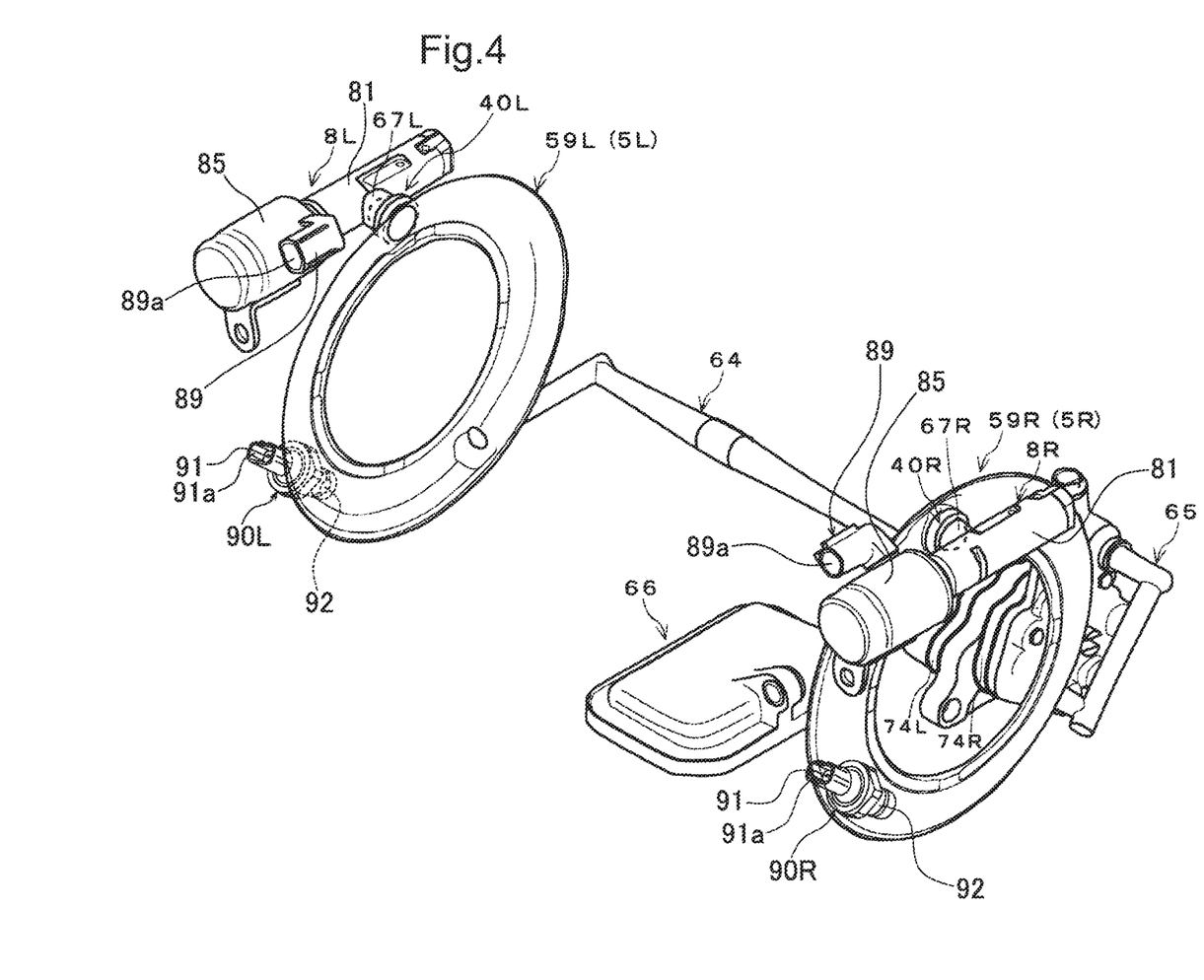
FIG. 4 is a perspective view showing an external appearance configuration of a hydraulic circuit of the hydraulic clutch device.

Hereinafter, an embodiment of the present invention will be explained with reference to accompanying drawings. FIG. 1 is a cross sectional view (cross sectional view taken in the direction of arrows X-X of FIG. 3(*b*)) showing the whole configuration of a power transmission device provided with a hydraulic clutch device in accordance with an embodiment of the present invention. FIG. 2 is an enlarged view of a part A of FIG. 1. FIG. 3 is a view showing an external appearance configuration of the power transmission device, wherein (a) is a plan view and (b) is a side view. Further, FIG. 4 is a perspective view showing an external appearance configuration of a hydraulic circuit of the hydraulic clutch device.

A power transmission device 100 shown in FIG. 1 is configured as a differential mechanism for distributing a rotation of a drive shaft 1 to left and right wheels (not shown). The drive shaft 1 is joined to a propeller shaft (not shown), and driving force from a driving source (engine) (not shown) is transmitted to the drive shaft. A hydraulic clutch device includes a drive bevel gear 2 which is integrally rotated with the drive shaft 1, a driven bevel gear 3 to be meshed with the drive bevel gear 2, a center shaft (rotation shaft) 4 which is arranged orthogonal to the drive shaft 1 and joined to the driven bevel gear 3 so as to be integrally rotated therewith, left and right hydraulic clutches 5L, 5R arranged on left and right sides of the center shaft 4, left and right output shafts 6L, 6R for transmitting each driving force transmitted by the left and right hydraulic clutches 5L, 5R, to each of left and right wheels (not shown), an oil pump (electric oil pump) 7 for feeding hydraulic fluid (oil) to each of piston chambers 59 (FIG. 2) of the left and right hydraulic clutches 5L, 5R, left and right pressure regulating valves 8L, 8R for regulating a pressure of the oil discharged from each of the piston chambers 59, a center casing 9 for housing the differential mechanism, and side casings 58L, 58R for housing each of the left and right hydraulic clutches 5L, 5R. The left and right side casings 58L, 58R are integrally fixed to openings located on left and right ends of the center casing 9, by fastening bolts 97 (see FIG. 3(*a*)). Herein, a power transmission part of the present invention is constituted by the above referred drive bevel gear 2 and driven gear 3. In the following explanation, when referred to "the axial direction of the rotation shaft" or when simply referred to "the axial direction", it designates the axial direction of the center shaft 4 (left and right direction of FIG. 1). Hereinafter, each configuration will be further explained.

The center shaft 4 is pivotally supported on the center casing 9 through taper bearings 11, 12. The center shaft 4 is generally configured to include a center large diameter part 4a, medium diameter parts 4b located on the left and right sides of the large diameter part 4a, and small diameter parts 4c located at left and right ends in the vicinity of the medium diameter parts 4b. The driven bevel gear 3 is fixed on the large diameter part 4a, so that the whole of the center shaft 4 is rotated integrally. A plurality of spline teeth are formed in the circumferential direction on each of the small diameter parts 4c located at the left and right ends of the center shaft 4 and are spline-connected to each of corresponding clutch guides 51 (FIG. 2) of the left and right hydraulic clutches 5L, 5R so as to be integrally rotated therewith.

The left and right hydraulic clutches 5L, 5R are formed of a wet multiple disc clutch. Since the left and right hydraulic clutches 5L, 5R have the same configuration, the explanation herein will be made, while referring to FIG. 2, with respect to only the right clutch 5R. For the similar reason, in the following explanation, subscripts L, R designating "left" and "right" will be omitted except as otherwise required to distinguish them.

As seen in FIG. 2, a plurality of separator plates (first friction members) 53 are arranged in parallel at predetermined intervals in the axial direction and spline-connected to an inner circumferential surface of the clutch guide 51 serving as an input side rotation member, while a plurality of friction plates (second friction members) 54 are arranged in parallel at predetermined intervals in the axial direction and spline-connected to an outer circumferential surface of a clutch hub 52 serving as an output side rotation member. The separator plates 53 and the friction plates 54 each are alternately arranged in an alternating way with each other in the axial direction thereby to form a layered body of the separator plates 53 and the friction plates 54. At the root of the clutch guide 51 there is formed a spline part 55, and the spline part 55 is spline-connected to the center shaft 4.

Similarly, a spline part 56 is formed close to the root of the clutch hub 52. The spline part 56 is spline-connected to the right output shaft 6R, and the clutch hub 52 is rotatably supported on the side casing 58 through a ball bearing 14 thereby to be rotated integral with the right output shaft 6R. On the other hand, the clutch guide 51 and the clutch hub 52 are mutually borne through a ball bearing 13 so as to be relatively rotatable.

The layered body (friction engagement part) of the separator plates 53 and the friction plates 54 is driven in the axial direction (in the left direction in FIG. 2) by a piston 57 at the time of engagement of the clutch. The separator plates 53 and the friction plates 54 are frictionally engaged with each other in response to the drive of the piston 57, so that the clutch is engaged. The piston 57 is hydraulically driven by the oil pressure of the piston chamber 59 and controlled such that a necessary clutch engagement amount is obtained in the friction engagement part.

At the side opposed to the friction engagement part of the piston 57 there is formed a pressing part 46 which projects in the axial direction (in the left direction in the drawing). The pressing part 46 presses the friction engagement part. At a tip portion of the pressing part 46 there is mounted a first thrust bearing 48 which rotatably supports the friction engagement part in the thrust direction. On the other hand, in a position facing a rear side of the clutch guide 51 of the center casing 9 there is formed a pressing load receiving part 47 which projects in the axial direction (in the right direction in the drawing). The pressing load receiving part 47 receives the pressing load of the piston 57 applied to the friction engagement part. At a tip portion of the pressing load receiving part 47 there is mounted a second thrust bearing 49 which rotatably supports the clutch guide 51 in the thrust direction.

Incidentally, the center shaft 4 corresponds to "an input shaft" for the left and right hydraulic clutches 5L, 5R, and the left and right output shafts 6L, 6R correspond to "an output shaft" for the left and right hydraulic clutches 5L, 5R.

Referring again to FIG. 1, the electric oil pump 7 is composed of a motor part 71 generating rotation power and a pump part 72 which suctions the hydraulic fluid (oil) from an oil strainer 66 (FIG. 3) by the rotation power and forcibly feeds it to the left and right hydraulic clutches 5L, 5R. The pump part 72 has a double pump structure in which two left and right internal gear pumps (oil pumps) 74L, 74R are connected in series with each other on a pump shaft 73. Herein, in this embodiment, the left internal gear pump 74L forcibly feeds the oil to the piston chamber 59L of the left hydraulic clutch 5L, and the right internal gear pump 74R forcibly feeds the oil to the piston chamber 59R of the right hydraulic clutch 5R.

Each of the left and right pressure regulating valves 8L, 8R is formed of a linear solenoid valve (electromagnetic pressure regulating valve). The left and right pressure regulating valves 8L, 8R each in this embodiment are arranged right beside each of the piston chambers 59L, 59R of the left and right hydraulic clutches 5L, 5R in substantially bilateral symmetry. Accordingly, oil passages 67L, 67R extending from each of the left and right piston chambers 59L, 59R to each of the left and right pressure regulating valves 8L, 8R are constituted at the shortest distance, respectively. Further, filters (secondary filter: cleaning member) 40L, 40R for removing minute foreign matters contained in the hydraulic fluid circulating through the oil passages 67L, 67R are arranged in the oil passages 67L, 67R between the piston chambers 59L, 59R and the pressure regulating valves 8L, 8R.

Figures 5A, 5B:
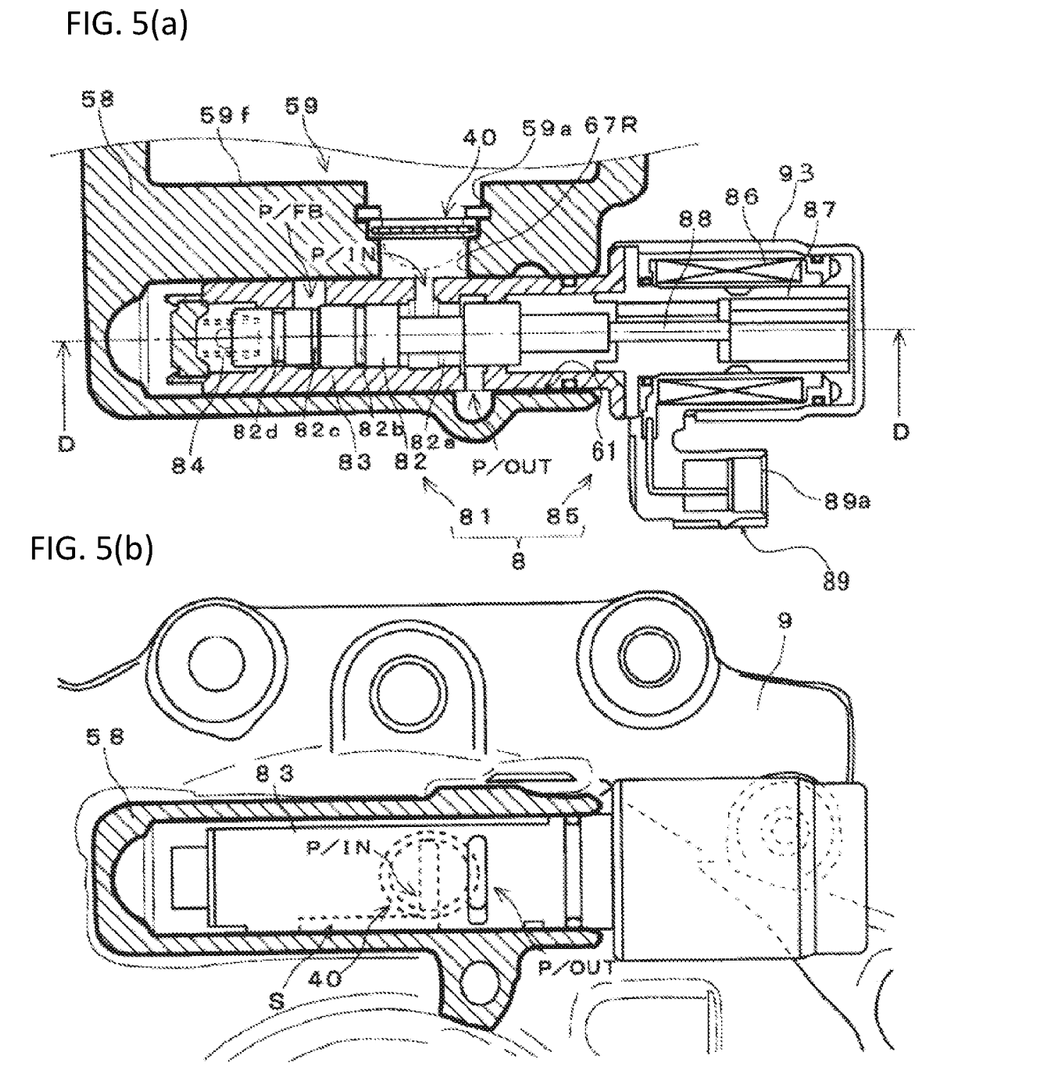

FIG. 5 is a cross sectional view of an essential part of the pressure regulating valve 8 (8R). Herein, FIG. 5(a) is a cross sectional view taken along line C-C of FIG. 2, and FIG. 5(b) is a cross sectional view taken along line D-D of FIG. 5(a). By the way, all of component elements such as the left and right pressure regulating valves 8L, 8R and the like having a subscript L or R in the reference character have the same symmetrical configuration. Therefore, in the following explanation, such subscripts L, R will be omitted except as otherwise required to distinguish them. As seen in FIG. 5(a), the pressure regulating valve 8 is configured in such a way as to connect a linear solenoid part 85 in series to a valve part 81 which is composed of a spool 82, a body 83 and a spring 84. Herein, the valve part 81 and the linear solenoid part 85 of the pressure regulating valve 8 correspond to a main body part of the present invention. Further, in this pressure regulating valve 8, the valve part 81 is inserted into and housed in an accommodating hole 61 famed in the side casing 58, and the linear solenoid part 85 is exposed to the outside of the side casing 58.

The linear solenoid part 85 is composed of a coil 86 which generates lines of magnetic force, a hollow cylindrical magnetic substance 87 which permeably transmits the lines of magnetic force generated by the coil 86, a plunger 88 which is driven in the axial direction by the action of the lines of magnetic force, a coupler (connector) 89 to which a wiring member (not shown) for supplying electric current to the coil 86 is connected, and a casing 93 for covering the whole. The plunger 88 is joined to an end portion of the spool 82, and the magnetic substance 87 is joined to the body 83. The coupler 89 is a part formed in the shape of projection which projects radially outward from an outer circumferential surface of the linear solenoid part 85, and a joining opening 89a for joining the wiring member thereto is provided at a tip portion of the coupler 89. The joining opening 89a is opened toward the side (the right side in FIG. 5(a)) of the linear solenoid part 85 in the longitudinal direction (in the axial direction) of the valve part 81 and the linear solenoid part 85. The wiring member (not shown) joined to the joining opening 89a is arranged so as to extend from the valve part 81 to the side of the linear solenoid part 85 along the longitudinal direction of the valve part 81 and the linear solenoid part 85.

An inlet port P/IN, an outlet port P/OUT and a feedback port P/FB each are formed in the body 83, and a first annular oil passage 82a, a second annular oil passage 82b, a third annular oil passage 82c and a fourth annular oil passage 82d each are formed between the spool 82 and the body 83.

The first annular oil passage 82a provides communication between the inlet port P/IN and the outlet port P/OUT. On the other hand, the second annular oil passage 82b, the third annular oil passage 82c and the fourth annular oil passage 82d are annular passages provided in such a manner that the oil discharged from the piston chamber 59 acts on the spool 82 as the feedback pressure. As seen in FIG. 5(b), an aperture S is formed partially between the side casing 58 and the body 83, so that the oil discharged from the piston chamber 59 flows into the feedback port P/FB through the aperture S and acts on the spool 82 as the feedback pressure.

Accordingly, the oil flowing into the inlet port P/IN of the pressure regulating valve 8 from the piston chamber 59 of the hydraulic clutch 5 through the filter 40 is pressure-regulated to the oil pressure balancing three power components of the feedback pressure (oil pressure) of the oil discharged from the piston chamber 59, the thrust of the plunger 88 of the linear solenoid part 85, and the elastic force acting on the valve body by the spring 84, and is discharged to a downstream side from the outlet port P/OUT of the pressure regulating valve 8.

Further, as seen in FIGS. 2 and 4, the pressure regulating valve 8 is arranged in the vicinity of the outside of the piston chamber 59 (the outside in the axial direction of the center shaft 4). Like this, since the pressure regulating valve 8 is arranged in the vicinity of the outside of the piston chamber 59, the oil passage from the piston chamber 59 to the inlet port P/IN of the pressure regulating valve 8 can be connected at the shortest distance, so that the pressure loss of the oil passage 67 extending from the piston chamber 59 to the pressure regulating valve 8 can be minimized. In addition, as will be described later, the oil discharged from the outlet port P/OUT of the pressure regulating valve 8 can be introduced into an interior of the hydraulic clutch 5 not through a shaft axis oil passage formed in the inside of the shaft.

Referring again to FIG. 2, in the interior of the side casing 58 there is formed a lubrication oil passage 60 by which the oil discharged from the outlet port P/OUT of the pressure regulating valve 8 is led directly to the interior of the hydraulic clutch 5. In other words, in the hydraulic clutch device of this embodiment, the oil discharged from the outlet port P/OUT of the pressure regulating valve 8 is introduced directly into the interior of the hydraulic clutch 5 through the lubrication oil passage 60 without the intervention of the oil passage (the shaft axis oil passage) formed in the inside of the shaft, and the introduced oil is stirred by the rotation of the clutch hub 52, whereby rotational sliding parts such as the ball bearings 13, 14 and the like are lubricated. Therefore, a first through hole 52a is provided in a part of the clutch hub 52 facing the ball bearing 13 in such a manner that the oil introduced into the interior of the hydraulic clutch 5 through the lubrication oil passage 60 efficiently and evenly spreads over the ball bearings 13, 14. Moreover, a second through hole 52b passing through between an inner circumferential surface and an outer circumferential surface in the radial direction of the clutch hub 52 is provided in such a manner that the oil efficiently and evenly spreads over the separator plates 53 and the friction plates 54.

Figure 6:
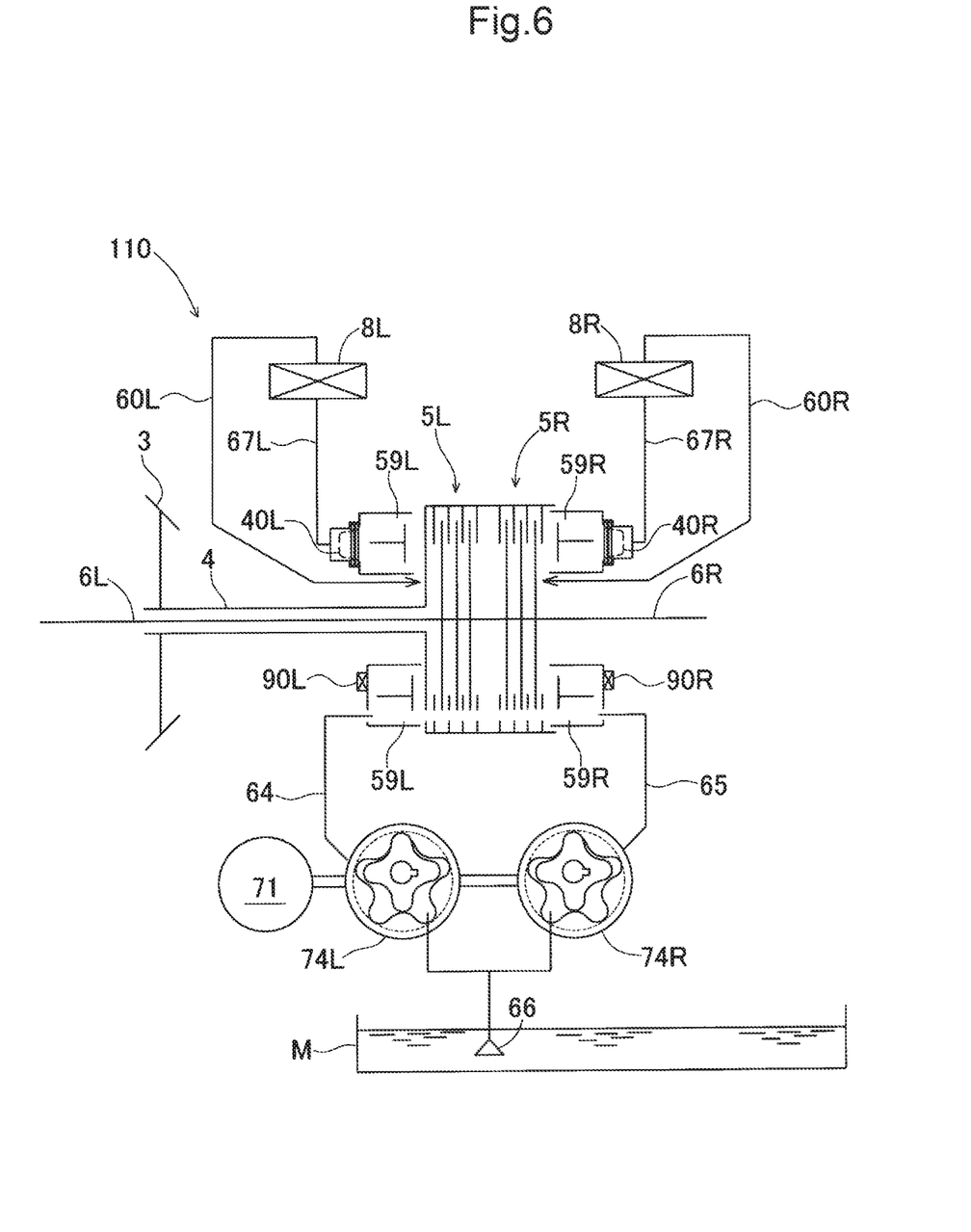
FIG. 6 is a hydraulic circuit diagram showing the hydraulic circuit of left and right hydraulic clutches.

FIG. 6 is a hydraulic circuit diagram showing a hydraulic circuit 110 of the left and right hydraulic clutches 5L, 5R. As seen in FIG. 6, oil passages 64, 65 which extend to a downstream side and communicate with the left and right piston chambers 59L, 59R of the left and right hydraulic clutches (the clutch device) 5L, 5R are connected to the left and right oil pumps 74L, 74R for pumping up the oil from the oil strainer 66 arranged in an oil reservoir M. Further, the left and right pressure regulating valves 8L, 8R are arranged on the downstream side in the oil flowing direction of each of the hydraulic clutches 5L, 5R, and the filters 40L, 40R are arranged between each of the piston chambers 59L, 59R of the left and right hydraulic clutches 5L, 5R and each of the left and right pressure regulating valves 8L, 8R. In addition, lubrication oil passages 60L, 60R extending to the downstream side from the left and right pressure regulating valves 8L, 8R are configured so as to feed the hydraulic fluid (lubrication oil) to the interiors of the hydraulic clutches 5L, 5R. Furthermore, oil pressure sensors 90L, 90R for detecting the oil pressure of the oil within the piston chambers 59L, 59R are arranged in the left and right piston chambers 59L, 59R.

Although the oil pumps 74L, 74R discharge the oil by driving the motor part 71, the oil discharged from the left and right oil pumps 74L, 74R passes through the left and right piston chambers 59L, 59R without stopping, when the left and right pressure regulating valves 8L, 8R are opened. Therefore, the left and right hydraulic clutches 5L, 5R are not engaged. On the other hand, when the left and right pressure regulating valves 8L, 8R are opened at the predetermined degree of opening, the oil pressures of the left and right piston chambers 59L, 59R located on the upstream side of the pressure regulating valves 8L, 8R are raised, and the left and right hydraulic clutches 5L 5R are engaged by the predetermined engagement force whereby to transmit the driving force to the left and right output shafts 6L, 6R.

Figure 7:
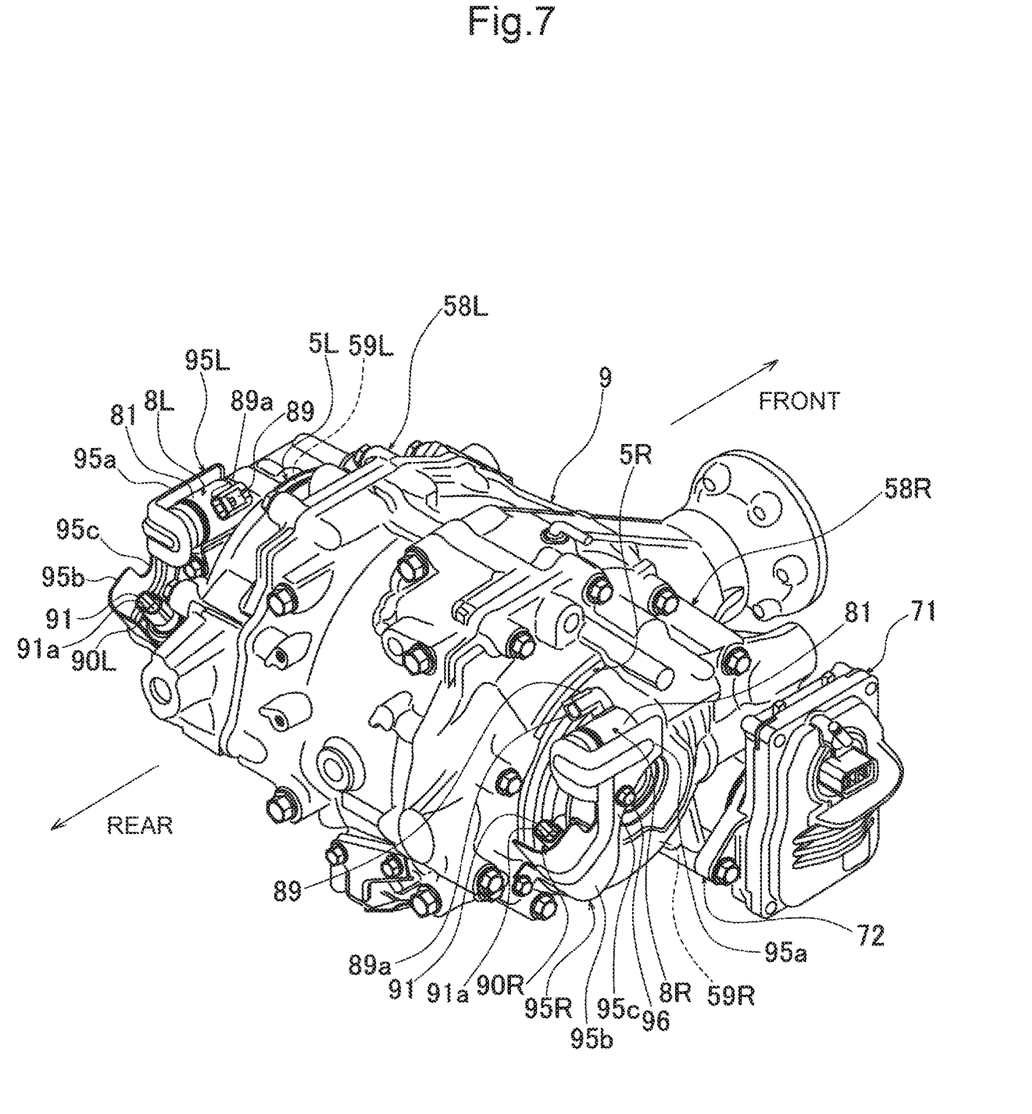
FIG. 7 is a perspective view showing an external appearance configuration of the power transmission device.
Figure 8:
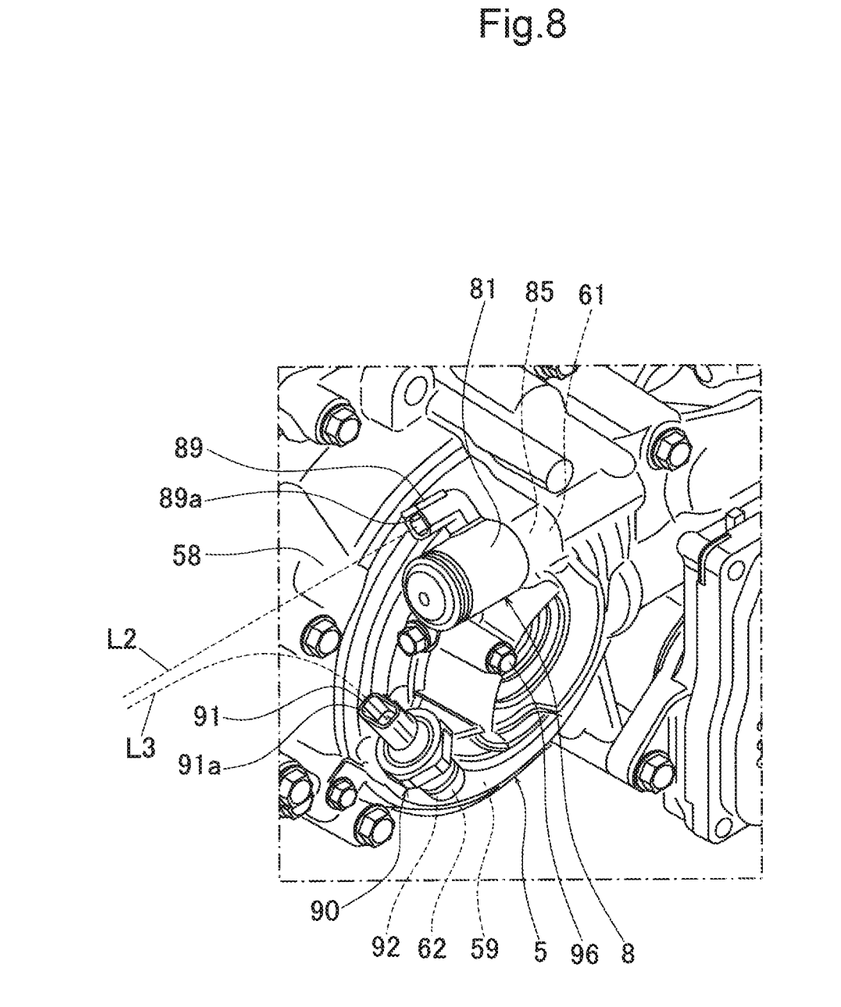
FIG. 8 is a view showing a condition where a cover is removed.

Herein, the arrangement configuration of the pressure regulating valve 8 and the oil pressure sensor 90 in the hydraulic clutch device of this embodiment will be explained in detail. FIG. 7 is a perspective view showing an external appearance configuration of the power transmission 100. In addition, FIG. 8 is a view showing a condition where a cover (protection member) 95 to be referred to later is removed. As seen in FIG. 1 above, the pressure regulating valve 8 (8L, 8R) and the oil pressure sensor 90 (90L, 90R) provided in the hydraulic clutch device of this embodiment are arranged in the vicinity of the opposite side to the power transmission part 2, 3 in the axial direction (in the left and right direction of the drawing) of the center shaft 4 with respect to the hydraulic clutch 5. In other words, the pressure regulating valve 8 and the oil pressure sensor 90 are arranged in a location close to the outside in the axial direction of the center shaft 4 with respect to the oil chamber 59 of the hydraulic clutch 5.

As explained above, the pressure regulating valve 8 and the oil pressure sensor 90 are mounted in the side casing 58 which houses the hydraulic clutch 5. Specifically, as seen in FIG. 8, the pressure regulating valve 8 is inserted into and fixed to the accommodation hole (accommodation part) 61 (see FIG. 5(a)) which is provided in a location above the middle position in the height direction of the hydraulic clutch 5 (the piston chamber 59) in the side casing 58. Moreover, the oil pressure sensor 90 is fixed to another accommodation hole (accommodation part) 62 which is provided in a location below the middle position in the height direction of the hydraulic clutch 5 in the side casing 58, in a condition where a sensor part 92 (main body part) 92 on the root side thereof is inserted into the accommodation hole 62. As regards the oil pressure sensor 90, a portion of the sensor part 92 is arranged within the piston chamber 59 through the accommodation hole 62, whereby the oil pressure sensor 90 is configured to detect the oil pressure within the piston chamber 59. In addition, a coupler (connector) 91 for connecting the wiring member is exposed outwardly of the side casing 58 from the accommodation hole 62.

Further, as seen in FIG. 7, a cover (protection member) 95 is provided so as to cover at least a part of these pressure regulating valve 8 and oil pressure sensor 90 which are exposed from the side casing 58. The cover 95 is made of metallic press-formed component, for example, and configured so as to be integrally provided with a first cover part 95a for covering an outer lateral surface and a rearward end surface in the longitudinal direction of the linear solenoid part 85 of the pressure regulating valve 8, a second cover part 95b for covering an outer lateral surface of the oil pressure sensor 90, and a connection part 95c for providing a connection between the first cover part 95a and the second cover part 95b. This cover 95 is fixedly secured to an outer surface (surface facing the outside in the axial direction of center shaft 4) of the side casing 58 by fastening a bolt (fastener) 96 which is inserted into the connection part 95c. Herein, the cover 95 may be an integrally molded component of a synthetic resin and the like, other than the above metallic press-formed component.

Further, the coupler 89 of the pressure regulating valve 8 is arranged in an obliquely upward position inclined to a closer side to the hydraulic clutch 5 with respect to a position right above the linear solenoid part (main body part) 85. With this configuration, the coupler 89 is arranged so as to be interposed between the linear solenoid part 85 of the pressure regulating valve 8 and the hydraulic clutch 5 (the outer surface of the side casing 58).

Further, the coupler 89 of the pressure regulating valve 8 and the coupler 91 of the oil pressure sensor 90 are configured such that each of the wiring members connected to these couplers extends in substantially the same direction. Specifically, the coupler 89 of the pressure regulating valve 8 is arranged such that the connected wiring member extends rearwardly (in the direction along L2 of FIG. 8) of the power transmission device 100 in a straight form (substantially horizontally), and the coupler 91 of the oil pressure sensor 90 is arranged such that the connected wiring member extends in such a way as to rise upwardly (in the direction along L3 of FIG. 3) toward the rear side. Accordingly, the wiring member connected to the coupler 89 of the pressure regulating valve 8 and the coupler 91 connected to the oil pressure valve 90 are configured so as to extend in substantially the same direction (position) at the rear of the power transmission device 100.

As explained above, in the hydraulic clutch 5 of this embodiment, the pressure regulating valve 8 is located on the downstream side in an oil flowing direction of the hydraulic clutch 5 and arranged in the vicinity of the opposite side to the power transmission part 2, 3 in the axial direction of the center shaft 4 with respect to the hydraulic clutch 5. Like this, since the pressure regulating valve 8 is arranged in the vicinity of the opposite side to the power transmission part 2, 3 in the axial direction of the center shaft 4 with respect to the hydraulic clutch 5, it is possible to dispense with a pressure regulating valve arranged between a power transmission part and a hydraulic clutch and a valve body integrally provided with the pressure regulating valve in a conventional hydraulic clutch device. Therefore, the power transmission part 2, 3 and the hydraulic clutch 5 can be arranged close to each other, so that it is possible to accomplish the reduction in external dimension (especially, dimension in the axial direction of the center shaft 4), the simplification in configuration, the weight saving, and the like, with respect to the hydraulic clutch device and the power transmission device 100. Especially, with respect to the drive shaft including the center shaft 4 and the output shaft 6, the length dimension L1 from the bearing 12 shown in FIG. 1 to the end portion on the inner diameter side (on the side of the center shaft 4) of the side casing 58 can be suppressed to be short.

Further, the pressure regulating valve 8 is mounted in the side casing 58 in which the hydraulic clutch 5 is housed, and there is provided the cover 95 which covers at least a part of the pressure regulating valve 8 exposed from the side casing 58. With this configuration, the pressure regulating valve 8 exposed from the side casing 58 can be protected by the provision of the cover 95. In addition, since a part of the pressure regulating valve 8 is exposed from the side casing 58, it is possible to access the pressure regulating valve 8 merely by removing the cover 95 at the time of replacement and maintenance of the pressure regulating valve 8. Therefore, the maintainability of the pressure regulating valve 8 can be improved, and, since at least a part of the pressure regulating valve 8 is covered by the cover 95, the protection of the pressure regulating valve 8 can be provided. Thus, the improvement in maintainability and the protection of the pressure regulating valve 8 can be made compatible.

Moreover, there is provided the oil pressure sensor 90 for detecting the oil pressure of the oil fed to the hydraulic clutch 5, and this oil pressure sensor 90 is arranged in the vicinity of the opposite side to the power transmission part 2, 3 in the axial direction of the center shaft 4 with respect to the hydraulic clutch 5. With this configuration, since both of the pressure regulating valve 8 and the hydraulic clutch 5 are arranged in the vicinity of the opposite side to the power transmission part 2, 3 in the axial direction of the center shaft 4, the oil pressure sensor 90 also is not required to be arranged between the power transmission part 2, 3 and the hydraulic clutch 5. Therefore, since the power transmission part 2, 3 and the hydraulic clutch 5 are able to be arranged closer to each other, the external dimensions (especially, dimensions in the axial direction of the center shaft 4) of the hydraulic clutch device and the power transmission device 100 can be further reduced.

Further, in the hydraulic clutch device of this embodiment, the pressure regulating valve 8 is arranged above the middle position in the height direction of the hydraulic clutch 5, and the oil pressure sensor 90 is arranged below the middle position in the height direction of the hydraulic clutch 5. In other words, with respect to the piston chamber 59 which has a circular and annular shape when viewed in the axial direction of the center shaft 4, the pressure regulating valve 8 is located in a position corresponding to an upper part (upper half) above the middle position in the height direction of the piston chamber 59, and the oil pressure sensor 90 is located in a position corresponding to the lower part (lower half) below the middle position in the height direction of the piston chamber 59. With this configuration, since the pressure regulating valve 8 and the oil pressure sensor 90 are able to be arranged in such a way as not to overlap with each other in the axial direction of the center shaft 4, in such a configuration that both of the pressure regulating valve 8 and the oil pressure sensor 90 are arranged on the same side (outside) in the axial direction with respect to the hydraulic clutch 5, projecting dimensions (outwardly projecting dimensions in the axial direction of the center shaft 4) of the pressure regulating valve 8 and the oil pressure sensor 90 from the hydraulic clutch 5 can be reduced. Therefore, the external dimensions of the hydraulic clutch device and the power transmission device 100 can be minimized.

Further, the cover 95 covers at least apart of the pressure regulating valve 8 exposed from the side casing 58 and at least a part of the oil pressure sensor 90 exposed from the side casing 58. With this configuration, both of the pressure regulating valve 8 and the oil pressure sensor 90 can be protected by the single cover 95. Therefore, components parts of the hydraulic clutch device and the power transmission device 100 can be decreased, so that the configuration can be simplified.

Further, the coupler 89 provided in the pressure regulating valve 8 is arranged in an obliquely upward position inclined to a closer side to the hydraulic clutch 5 with respect to a position right above the linear solenoid part 85. With this configuration, the coupler 89 is arranged so as to be interposed between the linear solenoid part 85 of the pressure regulating valve 8 and the hydraulic clutch 5, so that an arrangement space of the coupler 89 can be optimized. Therefore, the external dimensions of the hydraulic clutch device may be further reduced. Moreover, since the coupler 89 is arranged in the obliquely upward position of the linear solenoid part 85, the connecting operation of the wiring member to the coupler 89 can be easily performed. Thus, the workability for mounting work and replacement work of the pressure regulating valve 8 can be improved.

Further, the coupler 89 of the pressure regulating valve 8 and the coupler 91 of the oil pressure sensor 90 are configured such that each of the wiring members connected to these couplers extends in substantially the same direction. With this configuration, since the wiring member connected to the coupler 89 of the pressure regulating valve 8 and the wiring member connected to the coupler 91 of the oil pressure sensor 90 extend in substantially the same direction (in the rearward direction of the power transmission device 100), these wiring members can be bound together and gathered in one place. Therefore, the arrangement space of the wiring members can be suppressed to be small. Thus, the compactification and the simplification in configuration of the hydraulic clutch device can be accomplished. In addition, mounting operation of the pressure regulating valve 8 and the oil pressure sensor 90 can be easily performed in the assembling work of the hydraulic clutch device and the power transmission device 100.

While the embodiment of the present invention has been explained, the present invention is not limited to the above referred embodiment, and it is understood that various changes and modifications may be made in the invention within the appended claims and the scope of technical ideas described in the specification and drawings.

The invention claimed is:
1. A hydraulic clutch device comprising:
   a hydraulic clutch arranged in a power transmission route which comprises a power transmission part and an output rotation shaft rotatable around an axial direction thereof by motive power transmitted to the output rotation shaft from the power transmission part via the hydraulic clutch;
   an oil pump configured to supply oil to the hydraulic clutch;
   an oil pressure sensor configured to detect an oil pressure of the oil fed to the hydraulic clutch;
   a pressure regulating valve configured to pressure-regulate the oil supplied from the oil pump such that the hydraulic clutch is engageable by the oil pressure-regulated by the pressure regulating valve; and
   an oil chamber having an oil which is supplied by the oil pump and regulated by the pressure regulating valve such that the hydraulic clutch is engageable by the pressure-regulated oil,
   wherein the pressure regulating valve and the oil pressure sensor are located on a downstream side of the hydraulic clutch in an oil flowing direction and arranged in a vicinity of the hydraulic clutch at an opposite side of the power transmission part with respect to the hydraulic clutch in the axial direction of the output rotation shaft,
   the oil chamber has a substantially circular and annular shape when viewed from the axial direction of the output rotation shaft, and
   the pressure regulating valve and the oil pressure sensor are located on a downstream side of the oil chamber in the oil flowing direction and arranged at an opposite side of the power transmission part with respect to the oil chamber in the axial direction of the output rotation shaft.

2. The hydraulic clutch device according to claim 1, further comprising:
a casing configured to house the hydraulic clutch therein the pressure regulating valve being mounted in the casing; and
a protection member which covers at least a part of the pressure regulating valve exposed from the casing.

3. The hydraulic clutch device according to claim 1, wherein the pressure regulating valve is arranged above the middle in the height direction of the hydraulic clutch, and the oil pressure sensor is arranged below the middle in the height direction of the hydraulic clutch.

4. The hydraulic clutch device according to claim 1, further comprising:
a casing configured to house the hydraulic clutch therein; and
a protection member which covers at least a part of the pressure regulating valve exposed from the casing,
wherein the oil pressure sensor is mounted on the casing, and the protection member covers at least a part of the oil pressure sensor exposed from the casing.

5. The hydraulic clutch device according to claim 1, wherein the pressure regulating valve has a main body part and a connector which is integrally provided with a side surface of the main body part so as to connect a wiring member to the main body part, and
wherein the connector of the pressure regulating valve is arranged in an obliquely upward position inclined to the side closer to the hydraulic clutch with respect to a position right above the main body part.

6. The hydraulic clutch device according to claim 1, wherein the pressure regulating valve has a main body part and a connector which is integrally provided on a side surface of the main body part so as to connect a wiring member to the main body part, and the oil pressure sensor has a connector which connects the wiring member, and
wherein the connector of the pressure regulating valve and the connector of the oil pressure sensor are configured such that each of the wiring members connected to the respective connectors extends in substantially the same direction in a state where the pressure regulating valve and the oil pressure sensor are mounted in a casing which is configured to house the hydraulic clutch therein.

7. The hydraulic clutch device according to claim 1, comprising:
a pair of the hydraulic clutches each of which is arranged on each of outsides in the axial direction of the output rotation shaft with respect to the power transmission part; and
a pair of the pressure regulating valves each of which is arranged on the outside of each of the pair of the hydraulic clutches.

8. The hydraulic clutch device according to claim 1, wherein the pressure regulating valve is arranged above a middle position in a height direction of the hydraulic clutch, and the oil pressure sensor is arranged below the middle position in the height direction of the hydraulic clutch.

9. The hydraulic clutch device according to claim 1, further comprising:
a casing configured to house the hydraulic clutch therein, the pressure regulating valve being mounted in the casing; and
a protection member which covers at least a part of the pressure regulating valve exposed from the casing.

10. The hydraulic clutch device according to claim 1, wherein the pressure regulating valve has a main body part and a connector which is integrally provided with a side surface of the main body part so as to connect a wiring member to the main body part, and
wherein the connector of the pressure regulating valve is arranged in an obliquely upward position inclined to the side closer to the hydraulic clutch with respect to a position right above the main body part.

11. The hydraulic clutch device according to claim 9, wherein the pressure regulating valve has a main body part and a connector which is integrally provided on a side surface of the main body part so as to connect a wiring member to the main body part, and the oil pressure sensor has a connector which connects the wiring member, and
wherein the connector of the pressure regulating valve and the connector of the oil pressure sensor are configured such that each of the wiring members connected to the respective connectors extends in substantially the same direction in a state where the pressure regulating valve and the oil pressure sensor are mounted in the casing.

12. The hydraulic clutch device according to claim 1, comprising:
a pair of the hydraulic clutches each of which is arranged on each of outsides in the axial direction of the output rotation shaft with respect to the power transmission part; and
a pair of the pressure regulating valves each of which is arranged on the outside of each of the pair of the hydraulic clutches.

* * * * *